United States Patent
Hu et al.

(10) Patent No.: US 9,389,994 B2
(45) Date of Patent: Jul. 12, 2016

(54) OPTIMIZATION OF MAP-REDUCE SHUFFLE PERFORMANCE THROUGH SHUFFLER I/O PIPELINE ACTIONS AND PLANNING

(71) Applicant: International Business Machines Corporation, Armonk, NY (US)

(72) Inventors: Zhenhua Hu, Toronto (CA); Hao Hai Ma, Markham (CA); Wentao Tang, Beijing (CN); Qiang Xu, ShannXi (CN)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 14/090,282

(22) Filed: Nov. 26, 2013

(65) Prior Publication Data

US 2015/0150017 A1    May 28, 2015

(51) Int. Cl.
G06F 9/46       (2006.01)
G06F 12/00      (2006.01)
G06F 9/54       (2006.01)

(52) U.S. Cl.
CPC ............... *G06F 12/00* (2013.01); *G06F 9/544* (2013.01)

(58) Field of Classification Search
None
See application file for complete search history.

(56) References Cited

FOREIGN PATENT DOCUMENTS

WO    2012144985 A1    10/2012

OTHER PUBLICATIONS

Grace Period Disclosure Product Announcement; "IBM Platform Symphony V6.1 enables scalable, high-performance grid services for parallel compute- and date-intensive analytic applications"; IBM United States Software Announcement 212-429; Dated Nov. 13, 2012.
Kung, et al.; "Speculative Pipelining for Compute Cloud Programming"; Harvard University, Cambridge MA, 2010.
Seo, et al.; "HPMR: Prefetching and Pre-Shuffling in Shared MapReduce Computation Environment"; Korean Advance Institute of Science and Technology; Copyright IEEE, 2009.
Jiong Xie; "Improving Performance of Hadoop Clusters"; Auburn, Alabama; Dec. 12, 2011; Copyright 2011 by Jiong Xie.

*Primary Examiner* — Wissam Rashid
(74) *Attorney, Agent, or Firm* — Daniel R. Simek; Maeve M. Carpenter (57) ABSTRACT

A shuffler receives information associated with partition segments of map task outputs and a pipeline policy for a job running on a computing device. The shuffler transmits to an operating system of the computing device a request to lock partition segments of the map task outputs and transmits an advisement to keep or load partition segments of map task outputs in the memory of the computing device. The shuffler creates a pipeline based on the pipeline policy, wherein the pipeline includes partition segments locked in the memory and partition segments advised to keep or load in the memory, of the computing device for the job, and the shuffler selects the partition segments locked in the memory, followed by partition segments advised to keep or load in the memory, as a preferential order of partition segments to shuffle.

10 Claims, 4 Drawing Sheets

OPTIMIZATION OF MAP-REDUCE SHUFFLE PERFORMANCE THROUGH SHUFFLER I/O PIPELINE ACTIONS AND PLANNING

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): Product Release Announcement titled, "IBM Platform Symphony V6.1 enables scalable, high-performance grid services for parallel compute-and data-intensive analytic applications", for a product made publicly available on Dec. 14, 2012, page(s) 2, Planned Availability Date section. www.ibm.com/common/ssi/ShowDoc.wss?docURL=/common/ssi/rep_ca/6/897/ENUS212-426/index.html&lang=en&request_locale=en

BACKGROUND OF THE INVENTION

The present invention relates generally to the field of distributed parallel processing using MapReduce, and more particularly to optimizing intermediate result shuffle performance for reduce tasks.

Processing very large data sets can be greatly improved by using a large number of computers, or nodes, and distributing the work to be done by processing smaller blocks of data in parallel. The large number of nodes is collectively referred to as a cluster if all the nodes are on the same local network and use similar hardware. If the nodes are shared across geographically and administratively distributed systems and use heterogeneous hardware, the collective nodes are referred to as a grid. A framework model that processes data in this manner is MapReduce, which splits large data sets into small records of key-value pairs, such that the pairs can be processed in parallel. A MapReduce job is a schedulable object comprised of one or more stages of map tasks and reduce tasks, which are scheduled by a scheduler that is a system service of software component in a grid. In general there can be multiple stages of map-reduce-reduce tasks. An initial map stage contains multiple map tasks that read their inputs from initial data input sources and write their partitioned outputs to tasks of subsequent reduce stages. An intermediate reduce stage contains multiple tasks that act as reduce tasks to fetch their partitioned and shuffled inputs from task outputs of previous stages but act as map tasks to write their partitioned outputs to tasks of subsequent reduce stages. A final reduce stage contains multiple reduce tasks that fetch their partitioned and shuffled inputs from task outputs of previous stages and write their outputs to final data output sinks. For simple cases, there can be a single stage of map tasks and two overall stages, including a map stage of map tasks and a subsequent reduce stage of reduce tasks, where the map tasks' outputs are partitioned and shuffled to reduce tasks. Map task outputs are also called intermediate results if there is more than one stage. MapReduce aids in processing and analyzing large volumes of structured and unstructured data. Application examples include indexing and search, graph analysis, text analysis, machine learning, data transformation, and so forth. These types of applications are often difficult to implement using the standard SQL employed by relational database management systems (DBMSs).

Each computer node within the cluster or grid can run multiple mappers, multiple reducers, and a shuffler. A mapper or reducer is an operating software component that runs map tasks or reduce tasks, respectively. In case of multiple stages of map-reduce-reduce as described previously, the same software component can act as a reducer to fetch input data from the previous stages but act as a mapper to write output data to subsequent stages. A mapper or reducer may be reused to run more than one map task or reduce task, respectively. A shuffler is a system service of software component per computer node that functions to shuffle partition segments of map task outputs (intermediate results) as inputs to reduce tasks.

A map task processes input key/value pair data and generates an intermediate result comprised of partition segments, as an output that is also in the form of a key/value pair. The output key of a map task can be the same or different from the input key of the map task. The intermediate results are partitioned by the map task output key. The number of partitions equals the number of reduce tasks in the subsequent stages to which the intermediate results are shuffled, one partition per reduce task. Because the total size of intermediate results on a computer node can be greater than the physical memory size of the node, the intermediate results are serialized into files so that they can be stored on the disks for reduce tasks to fetch at their pace and time.

Reduce tasks process the intermediate data results. Because one reduce task needs to process its corresponding partition of the intermediate results from multiple map tasks, a piece of data fetched for a reduce task from one map task output is called a partition segment. A reduce task needs to fetch a collection of such segments for its partition from every map task in the job. The data partition segments are shuffled from map tasks to the reduce tasks, which may run on different computers than those on which the map tasks run. The reducer of a reduce task fetches segments of its partition from every corresponding map task in the job and processes the fetched intermediate results to generate their results.

For load balancing purposes, fetch requests from a reducer to a shuffler come in rounds in which a reducer fetches up to a configurable number of segments of its partition from one shuffler, and then requests a fetch from the next shuffler, and so on, in a round-robin or random sequence. The reducer requests a fetch from each shuffler of nodes in the grid that are processing data for the same job.

A shuffler receives a fetch request from a reducer which includes the specific job ID, the reduce task ID which corresponds to the partition ID, and the map task ID that produced the intermediate results contained in the segment to be fetched for the reduce task. The shuffler responds to the reducer's fetch request to shuffle the intermediate results output by the map tasks.

If the intermediate results of map tasks have been written to a file, the operating system (OS) may initially cache the results in its page cache in memory, but as additional intermediate results are generated, the OS may have to write the cached results to disk and clean up the memory for other uses. If the reducer requests a fetch of the intermediate results that have been written to disk and flushed (cleaned up) from memory, the shuffler has to read the data from the disk, and send it to the reducer, which is significantly slower than reading the results from memory.

BRIEF SUMMARY

Embodiments of the present invention disclose a method, computer program product, and system for optimizing MapReduce shuffle performance. A processor receives information associated with partition segments of map task outputs and a pipeline policy for a job running on a computing device. The processor transmits to an operating system of the computing device a request to lock partition segments of the map task outputs in a memory of the computing device. The processor transmits to the operating system of the computing device an advisement to keep or load partition segments of map task outputs in the memory of the computing device, based on a capacity of the memory of the computing device. The processor creates a pipeline based on the pipeline policy, wherein the pipeline includes partition segments locked in the memory and partition segments advised to keep or load in the memory, of the computing device for the job, and the processor selects the partition segments locked in the memory, followed by partition segments advised to keep or load in the memory, as a preferential order of partition segments to shuffle.

DETAILED DESCRIPTION

Embodiments of the present invention recognize that performance of MapReduce processes are impacted by shufflers passively responding to fetch requests from reducers and having to retrieve map task results that may have been flushed from memory and written to disk. At the same time, other map task results for the same reduce task in the same job, residing in memory, may be ignored or paged out of memory to accommodate fetching specific results eventually requested in a later request round by the reducer. Additionally available scheduling information regarding the planned schedule location of reduce tasks is unused.

Embodiments of the present invention include optimization of a response by the shuffler to meet reducer fetch requests for the intermediate data from map task results by the shuffler operating to a pipeline policy. A pipeline policy is generated for each job running in a distributed computing grid, and defines the priority and actions of the shuffler responding to a round of a reducer's fetch request for map task results of a job. In addition to the pipeline policy, there are two configuration parameters per shuffler, MaxLockedMemoryForShuffle a maximum level of memory for locking some map task results in memory, and MaxAdviseMemroyForShuffle a maximum limit of memory for advising the operating system (OS) or a file system to retain some map task results in memory (e.g. page cache) if memory capacity allows and there is enough memory.

Embodiments of the present invention also enable planning of the node on which the reducer is scheduled and receipt of the reducer schedule information by the shuffler of a computing node. Making use of the information associated with the locality of intermediate data and a map-reduce affinity within a job, the scheduler can plan to run reduce tasks on the same or near nodes as their corresponding map tasks. Receiving information regarding the planned scheduling locations of reduce tasks from the scheduler, intermediate results can be shuffled by shufflers and mappers to the nodes on which the reduce tasks are planned for scheduling, prior to the start of the reduce tasks. The action, referred to as shuffle-ahead IO pipeline planning, hereafter "shuffle-ahead", enables prompt shuffling of partition segments from a map task node to reduce task nodes when an intermediate result is just generated by a map task, greatly increasing the chance of shuffling all partition segments in memory. Shuffle-ahead pipeline planning also eliminates some communication steps involving reducers; therefore, the partition segments can be directly pushed to their destination nodes for higher performance. The resources that otherwise would be used to run reduce tasks can be applied to run other workloads, e.g. the map tasks of the same job. The shuffled intermediate results or partition segments on a destination node can reside locally in memory, or can be merged into files on disk. When a planned reduce task is started on this destination node, the reduce task can get the partition segments from the local shuffler accessing the local memory and local disk, contributing to improved performance.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module" or "system". Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device. A computer-readable storage medium, as used herein, is not to be construed as being transitory signal per se, such as radio waves or other freely propagating electromagnetic waves, electromagnetic waves propagating through a waveguide or other transmission media (e.g., light pulses passing through a fiber-optic cable), or electrical signal transmitted through a wire.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

Figure 1:
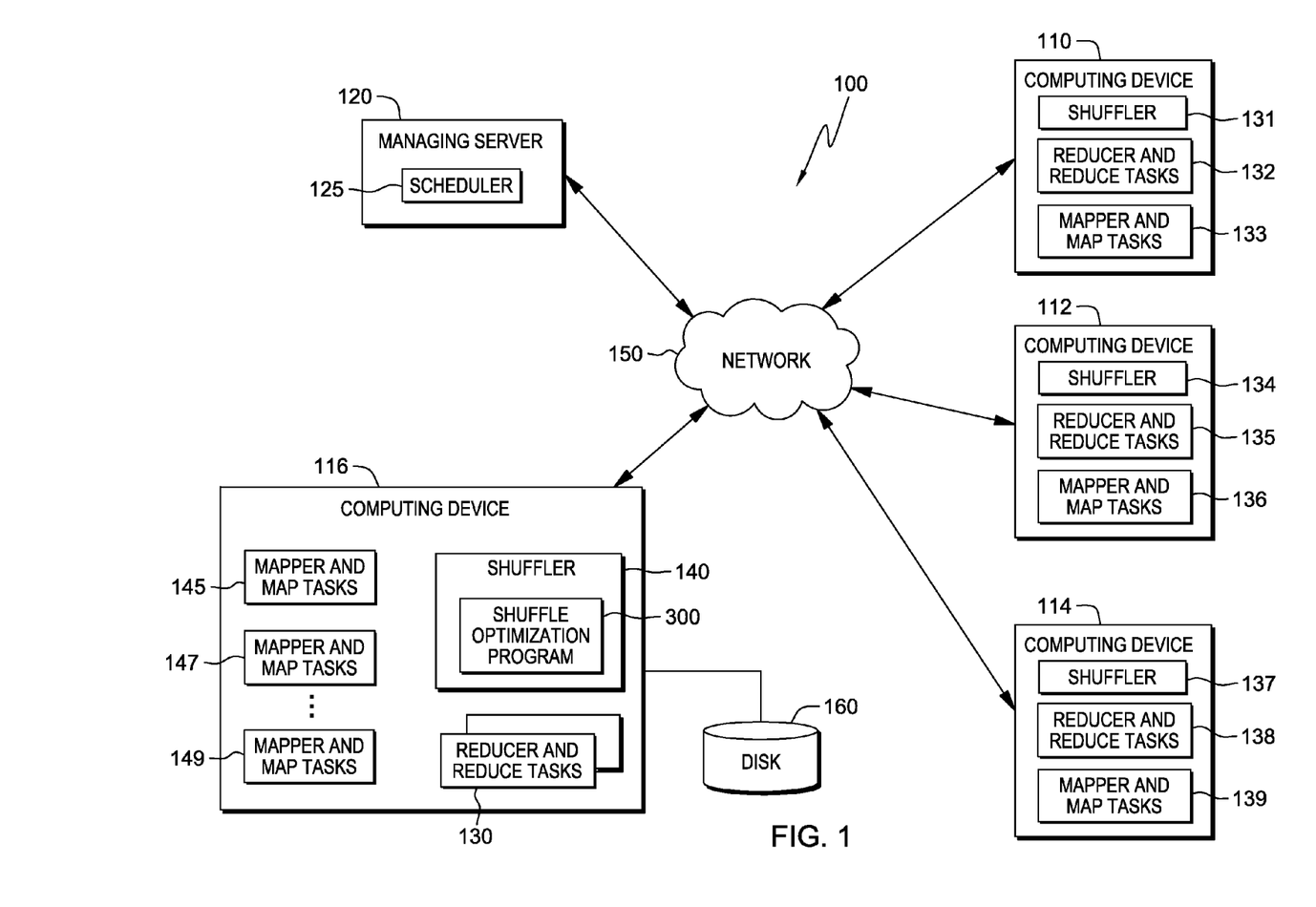
FIG. 1 is a functional block diagram illustrating distributed computing grid environment 100, in accordance with one embodiment of the present invention.

The present invention will now be described in detail with reference to the Figures. FIG. 1 is a functional block diagram illustrating distributed computing grid environment 100, in accordance with one embodiment of the present invention. Distributed computing grid environment 100 includes computing devices 110, 112, 114, and 116, and managing server 120, all interconnected through network 150.

Network 150 can be, for example, a local area network (LAN), a wide area network (WAN), such as the Internet, or a combination of the two, and can include wired or wireless connections. In general, network 150 can be any combination of connections and protocols that will support communications via various channels between computing devices 110, 112, 114, and 116, managing server 120 and computing grid 140, in accordance with an embodiment of the present invention.

Computing devices 110, 112, 114, and 116 represent a multiplicity of interconnected computing devices in distributed computing grid environment 100 that work in conjunction to perform common computing goals, such as performing parallel processing of large quantities of data. A master node of the computing grid receives input for a job, which is a schedulable object that can be divided into a group of tasks which are distributed or "mapped" to nodes within distributed computing grid environment 100. The divided group of tasks are mapped to multiple nodes and performed in parallel to produce intermediate results. The intermediate results from map tasks on multiple nodes are input to a reduce task that aggregates multiple inputs to a final result. The tasks are computations or logic that can be executed in parallel and are comprised of an input and an output. Tasks use resources which are referred to as slots on which a task can be scheduled. For simplicity, reference to resources and/or slots hereafter may include disk, memory, I/O, etc., but will primarily be directed to central processing units (CPUs) of computing devices within distributed computing grid environment 100.

Computing devices 110, 112, 114, and 116 can each be a laptop computer, a server computer, a web server, a specialized mobile computer server, a tablet, or a netbook personal computer (PC), a personal digital assistant (PDA), a smart phone, or any computing device capable of sending and receiving data across a network connection. In general, computing devices 110, 112, 114, and 116 are representative of any programmable electronic device or combination of programmable electronic devices capable of executing machine-readable program instructions. Computing devices 110, 112, 114, and 116 include internal and external hardware components, as depicted and described in further detail with respect to FIG. 4.

Computing device 116 is depicted as including mapper and map tasks 145, 147, and 149, shuffler 140, reducer and reduce tasks 130, and disk 160. Computing device 116 contains additional internal and external components as described further with respect to FIG. 4. Mapper and map tasks 145, 147, and 149 include software programs residing on computing device 116, referred to as mappers, which run map tasks that are distributed to multiple nodes within the computing grid, and when run perform a computation that produces an output. The output of a map task is partitioned into multiple partition segments which are shuffled to multiple corresponding reduce tasks as their inputs. Reducer and reduce tasks 130 are instances of the reducer software program running on computing device 116 and the reduce tasks scheduled and run on computing device 116.

Shuffler 140 is a system service residing on each computing node of distributed computing grid environment 100. Shuffler 140 "shuffles" the partition segments resulting from map tasks to reduce tasks that may reside on the same computing device as shuffler 140 or other computing devices within the distributed computing grid. Shuffler 140 receives a fetch request from a reducer, for example, reducer and reduce tasks 132, for specific partition segments to be shuffled or sent to the reducer to run a reduce task. A "shuffle" or shuffling refers to transmitting or sending partition segments to a destination node such as in a "push" action, whereas "fetching" refers to retrieving partition segments, such as a "pull" action.

Shuffle optimization program 300 is depicted as operating with shuffler 140, within computing device 116, and in one embodiment of the present invention, shuffle optimization program 300 operates as part of the shuffler of each node of distributed computing grid environment 100 that includes and operates mapper and map tasks, such as mapper and map tasks 145. Shuffle optimization program 300 responds to reducer fetch requests by prioritizing the "shuffle" of partition segments that are most readily available in memory or cached in an OS page over partition segments that have been written to disk and removed or "cleaned up" from memory. Shuffle optimization program 300 advises the OS between fetch request rounds of the reducer to have partition segments loaded in memory that are anticipated to be requested by the reducer in the subsequent request round. Additionally shuffle optimization program 300 uses a "shuffle-ahead" feature to shuffle map task results to nodes on which the corresponding reducer will be run, such that reduce task input access is local. Shuffle optimization program 300 improves overall performance by reducing the instances in which partition segments are fetched from disk.

Although FIG. 1 is illustrated to represent the possible separation of map tasks and reduce tasks, each computing device such as computing device 116 within distributed computing grid environment 100 includes one or more mapper and map tasks, such as mapper and map tasks 145, as well as a shuffler, such as shuffler 140, and one or more reducer and reduce tasks, such as reducer and reduce tasks 130.

Similar to computing device 116, computing devices 110, 112, and 114 are depicted as including shuffler 131, 134, and 137, respectively, reducer and reduce tasks 132, 135, and 138 respectively, as well as shufflers, mapper and map tasks 133, 136, and 139, respectively. Shufflers 131, 134, and 137 perform shuffling tasks on their respective computing devices as shuffler 140 performs for computing device 116. Mapper and map tasks 133, 136, and 139 perform functions on their respective computing devices as mapper and map task 145 performs on computing device 116. Mapper and map tasks 133, 136, and 139 may represent a plurality of mapper and map tasks operating within computing devices 110, 112, and 114, respectively.

Reducers are running software programs residing on computing devices or nodes of the computing grid environment that perform reduce tasks. Reduce tasks, which fetch their partition segments from the outputs of map tasks, referred to as intermediate results, perform operations that produce an aggregate final result. For load-balance reasons, fetch requests from a reducer to a shuffler usually come in multiple rounds. In each round a reducer requests up to a configurable number of segments of its partition from one shuffler, then it requests segments of its partition from another shuffler, and so on, in a round-robin or random manner, with an elapsed time between reducer fetch requests.

Managing server 120 includes scheduler 125. Managing server 120 is a master node of distributed computing grid environment 100 and receives job requests from client applications to be run. Managing server 120 is a server computing device that can be a desktop computer, a laptop computer, a specialized computer server, a client computer, a tablet, or a netbook personal computer (PC), a personal digital assistant (PDA), a smart phone, a mainframe computer, a web server computer, or a networked server computer. Further, managing server 120 can represent computing systems utilizing clustered computers and components to act as single pools of seamless resources when accessed through network 150, as is common in data centers and with cloud computing applications. In general, managing server 120 is representative of any programmable electronic device or combination of programmable electronic devices capable of executing machine-readable program instructions. Managing server 120 may include internal and external hardware components, as depicted and described in further detail with respect to FIG. 4.

Scheduler 125 is a software application that runs on the middleware of managing server 120. Scheduler 125 also schedules the tasks to be run for a client application job across the nodes of distributed computing grid environment 100. Tasks are mapped into multiple map tasks and scheduled by scheduler 125 across multiple nodes of the computing grid. Similarly, as map tasks are run and complete, scheduler 125 schedules reduce tasks to nodes of distributed computing grid environment 100. Typically there are multiple map tasks whose output serves as the input for a single reduce task. One reduce task processes all the partition segments of a full partition of map task outputs.

Figure 2A:
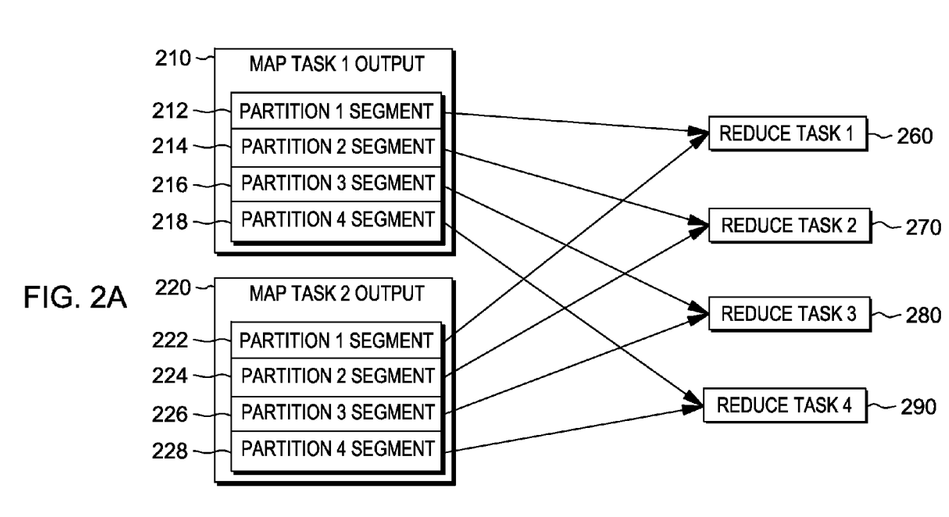
FIG. 2A is an exemplary block diagram illustrating the output of map tasks and the corresponding reduce task for a job running on multiple nodes within the distributed computing grid environment of FIG. 1, in accordance with an embodiment of the present invention.

FIG. 2A is an exemplary block diagram illustrating the output of map tasks and the corresponding reduce task for a job running on multiple nodes within the distributed computing grid environment of FIG. 1, in accordance to an embodiment of the present invention. FIG. 2A includes map task output 210, map task output 220, and reduce tasks 260, 270, 280, and 290. Map task output 210 includes partition 1 segment 212, partition 2 segment 214, partition 3 segment 216, and partition 4 segment 218. Map task output 210 is the result of the completion of a corresponding map task executing a block of input data, typically comprising 64 mega bytes (MB) to 512 MB of records. Map task output 210 is referred to as intermediate data, intermediate results, intermediate results file, or partition segments, in which multiple partition segments comprise the intermediate results or intermediate results file. The output of map tasks serves as input for the reduce tasks.

Partition 1 segment 212, partition 2 segment 214, partition 3 segment 216, and partition 4 segment 218, are the result of running a map task (not shown). Each partition corresponds to a reduce task, and each partition is comprised of multiple partition segments from multiple map tasks, which may be dispersed across many computing nodes of distributed computing grid environment 100. Partition 1 segment 212 is depicted as a segment of a partition that corresponds to reduce task 260. Similarly, partition 2 segment 214, partition 3 segment 216, and partition 4 segment 218 correspond to reduce tasks 270, 280, and 290, respectively.

Map task output 220 includes partition 1 segment 222, partition 2 segment 224, partition 3 segment 226, and partition 4 segment 228, each corresponding to reduce task 260, 270, 280, and 290, respectively. Reduce tasks of a job fetch partition segments from each node running map tasks of the same job; however, each reduce task only fetches its corresponding partition segments that are specific to each reduce task. For example, reduce task 260 fetches partition 1 segment 212 from map task 1 output and partition 1 segment 222 from map task 2 output.

All partition 1 segments that are map task outputs of nodes in the computing grid, for the same job, are fetched by the reducer for reduce task 260. Fetching involves the reducer for a reduce task sending fetch requests to the shuffler of nodes on which map tasks for the same job have run. The nodes running map tasks are identified from information provided to the reducer by scheduler 125 (FIG. 1). Without having to specify a specific partition segment, the reducer specifies a partition ID corresponding to the reduce task in the fetch request. A unique partition ID corresponds to one specific reduce task within a job. In an embodiment of the present invention, the shuffler receiving a fetch request from the reducer prioritizes the partition segments that are in memory or OS cache in the shuffler's response to the reducer request. The shuffler preferentially sends to the reducer the partition segments that are more readily available in memory, avoiding to the extent possible the need to retrieve partition segments that have been written to disk, as a response to the reducer fetch request. Pipeline policies are discussed by example and in greater detail in the discussion of FIG. 2B.

Figure 2B:
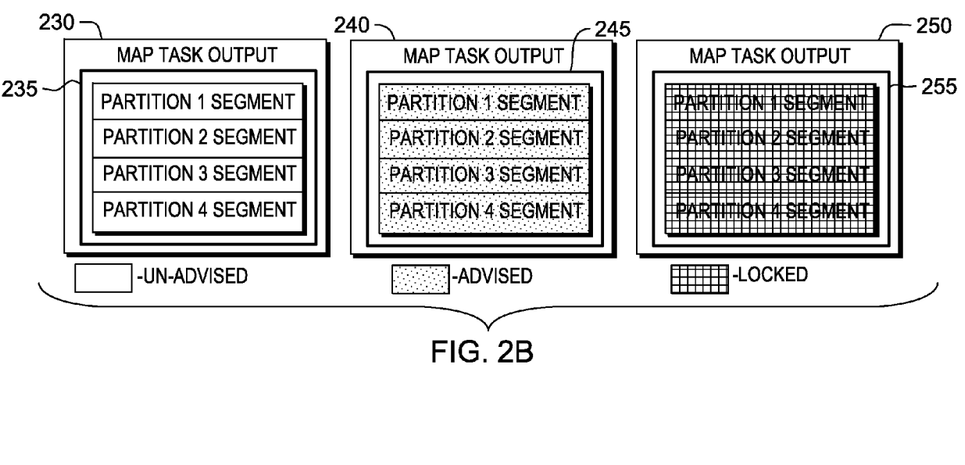
FIG. 2B is an exemplary block diagram illustration of pipeline policy actions applied to the output of map tasks of a job running on nodes within distributed computing grid environment 100 of FIG. 1, in accordance with an embodiment of the present invention.

FIG. 2B is an exemplary block diagram illustration of pipeline policy actions applied to the output of map tasks of a job running on nodes within distributed computing grid environment 100 of FIG. 1, in accordance with an embodiment of the present invention. A pipeline policy includes the actions and response of shufflers to prepare for and respond to reducers' fetch requests, as well as the use of the planned reducer scheduling information from the scheduler for shuffle-ahead activity. A shuffler, operating shuffle optimization program 300, builds an input/output (IO) pipeline for each job running map tasks on the shuffler's computer node, based on a pipeline policy. The shuffler gets detailed information of partition segments from a map task about the file path of the intermediate data file, the offset, and the length of every partition segment in the file. The shuffler uses information that is synchronized between the shuffler and the reducer, regarding the map task outputs of the job, to determine which partition segments have been sent to the reducer of the job and which have not yet been sent. In building the IO pipeline, referred to for simplicity as "a/the pipeline", based on the pipeline policy for the job, the shuffler, operating shuffle optimization program 300, may apply pipeline actions to the output of a map task. FIG. 2B includes map task output 230 containing partition segments 235, map task output 240 containing partition segments 245, and map task output 250 containing partition segments 255. A shuffler, such as shuffler 140 operating on computing device 116 (FIG. 1), has two configuration parameters that are used to control the physical and virtual memory usage for the pipeline. The first configuration parameter asks the OS to "lock" partition segments in physical memory up to a defined memory size. For example, MaxLockedMemoryForShuffle is created by mmap(MAP_LOCKED) or mlock( ) system calls on Linux. Once the partition segments are locked, they remain in memory until an unlock call, for example, munmap( ) is called. Partition segments 255 of map task output 250 are depicted as locked.

Within the memory size limits of MaxLockedMemoryForShuffle, the shuffler will lock partition segments in memory so they are readily available to be fetched by rounds of reducer fetch requests. Once partition segments are sent in response to a round of a reducer's requests, the shuffler will unlock the partition segments so that the memory can be used to lock other un-fetched segments.

The second shuffler configuration parameter advises the OS of a maximum memory size to keep partition segment that are still in OS page cache in physical memory and, if needed, to load partition segments into physical memory that have been written to disk. For example, MaxAdviseMemroyForShuffle is the maximum memory size a shuffler advises the OS to keep or load partition segments in physical memory. Once partition segments are "advised" the OS reads ahead according to its memory loads to determine partition segments that are in physical memory and adds priority to retain the advised partition segments in physical memory. The shuffler establishes a pipeline of partition segments in memory to more efficiently shuffle reducer requests for the next round of reducer requests. Partition segments 245 of map task output 240 are depicted as advised partition segments.

The advised partition segment memory limit includes within its memory capacity, the locked partition segment memory limit, meaning that MaxLockedMemoryForShuffle is smaller than and part of MaxAdvisedMemoryForShuffle. The advise can be done by madvise(MADV_WILLNEED|MADV_SEQUENTIAL), or posix_fadvise (POSIX_FADV_WILLNEED|POSIX_FADV_SEQUENTIAL) system calls on Linux. Once advised segments are fetched, the shuffler can call madvise(MADV_DONTNEED) or posix_fadvise(POSIX_FADV_DONTNEED) to un-advise the segments so that the freed space can be used to advise other un-fetched partition segments that are not advised yet.

Partition segments 235 of map task output 230 are depicted as un-advised and may reside in physical memory if adequate capacity remains. If other OS priority or limited memory capacity exists, partition segments 235 may be flushed from physical memory and written to disk.

There can be a different pipeline policy for shuffling partition segments to reducers for each running job. In one embodiment of the present invention, a pipeline policy of "Advise_Latest_InterData" is applied to a current job. The Advise_Latest_InterData pipeline policy advises the latest intermediate result file of a map task for the current job when the file is just written to the OS page cache. This keeps the latest partition segments of the results of a map task in physical memory, making the partition segments readily available to shuffle when a reducer fetch request is received. After a partition segment of a map task is fetched, the segment will be un-advised and may be flushed from memory, making room for additional intermediate results of running map tasks. Additionally, if the total advised memory limit is exceeded, the pipeline policy Advise_Latest_InterData will un-advise the oldest advised but un-fetched partition segments in the job, to make additional advised memory available. If the total advised memory limit is not exceeded, it will advise some un-advised and un-fetched partition segments in the job for the next round of fetches. The shuffler operating to the Advise_Latest_InterData pipeline policy preferentially first sends partition segments in advised memory to a reducer when it is coming for a round of fetches to prevent the segments from being written to disk, then sends segments in "un-advised" memory, as the capacity of current fetch round of the reducer allows.

In another embodiment of the present invention a "Lock_InterData_For_All_Reduce" pipeline policy may be applied, which is similar to Advise_Latest_InterData policy, but adds a memory locking action. If the total locked and to-be-locked memory is less than or equal to the maximum locked memory limit for the shuffler, an entire intermediate result file of a map task is locked in memory when the file is written to the OS cache page. If the maximum locked memory limit is reached, the policy stops locking map task results and advises an entire intermediate result file of a map task if the advised memory limit allows. The policy preferentially shuffles locked partition segments first, then advised partition segments, then un-advised partition segments, as the capacity of current fetch round of the reducer allows.

In yet another embodiment of the present invention, an "Advise_Lock_Segment_For_Individual_Reduce" policy may be applied. This policy is for the case in which some, but not all, of the reduce tasks of a job are active, for example, if there are not enough resources on which all the reducers can run. In this case, partition segments corresponding to active reducers are locked and advised, whereas partition segments corresponding to reducers that are not running are not placed in locked memory or advised memory.

If the locked memory capacity allows, the Advise_Lock_Segment_For_Individual_Reduce policy will only lock a round of partition segments for an active reduce task of a job at a time, as the segments are just written to the OS page cache or if they have been advised most recently. If the total locked memory exceeds the maximum locked memory limit, then the policy only advises partition segments. The policy follows the same preferential order of shuffling partition segments for a reducer fetch round as the other policies previously mentioned, and the fetched partition segments are un-locked and un-advised to free memory for additional map task results.

Embodiments of the present invention are not limited by the pipeline policies discussed herein as exemplary pipeline policies. Many other policies are possible and consistent with building and use of a pipeline of partition segments based on a pipeline policy for a given job.

Shuffle optimization program 300 enables a shuffler, such as shuffler 140 (FIG. 1), to proactively determine the order of which partition segments are sent in response to a current round of a reducer fetch request, and which partition segments to read ahead for the next round of reducer fetch requests. In embodiments of the present invention, a reducer fetch request only needs to provide the job ID, partition ID (i.e. reduce task ID), and a number of partitions segments to fetch; the shuffler will decide the sending and read-ahead order based on the pipeline plan for the job and information regarding the partition segments. The information includes which partition segments are "locked" in memory of the computer on which the shuffler resides, partition segments that are "advised" and may still be in OS page cache, partition segments that are "un-advised", which are neither locked nor advised and may be flushed out of memory and written to disk.

In embodiments of the present invention, the shuffler will send the partition segments to the reducer for the current round of fetch request to prioritize sending segments that are "locked" in physical memory. If the capacity of the current round of reducer fetch requests is not exceeded, then the shuffler will send partition segments that are "advised" and in OS page cache. If the capacity of the current round of reducer fetch requests is still not exceeded, the shuffler will send segments that are "un-advised", which may not be available in physical memory. The shuffler may decide to stop sending or send fewer segments that are advised or un-advised than the reducer requested. This decreases the chance of having to retrieve partition segments that have been written to disk, which will slow performance.

Figure 3:
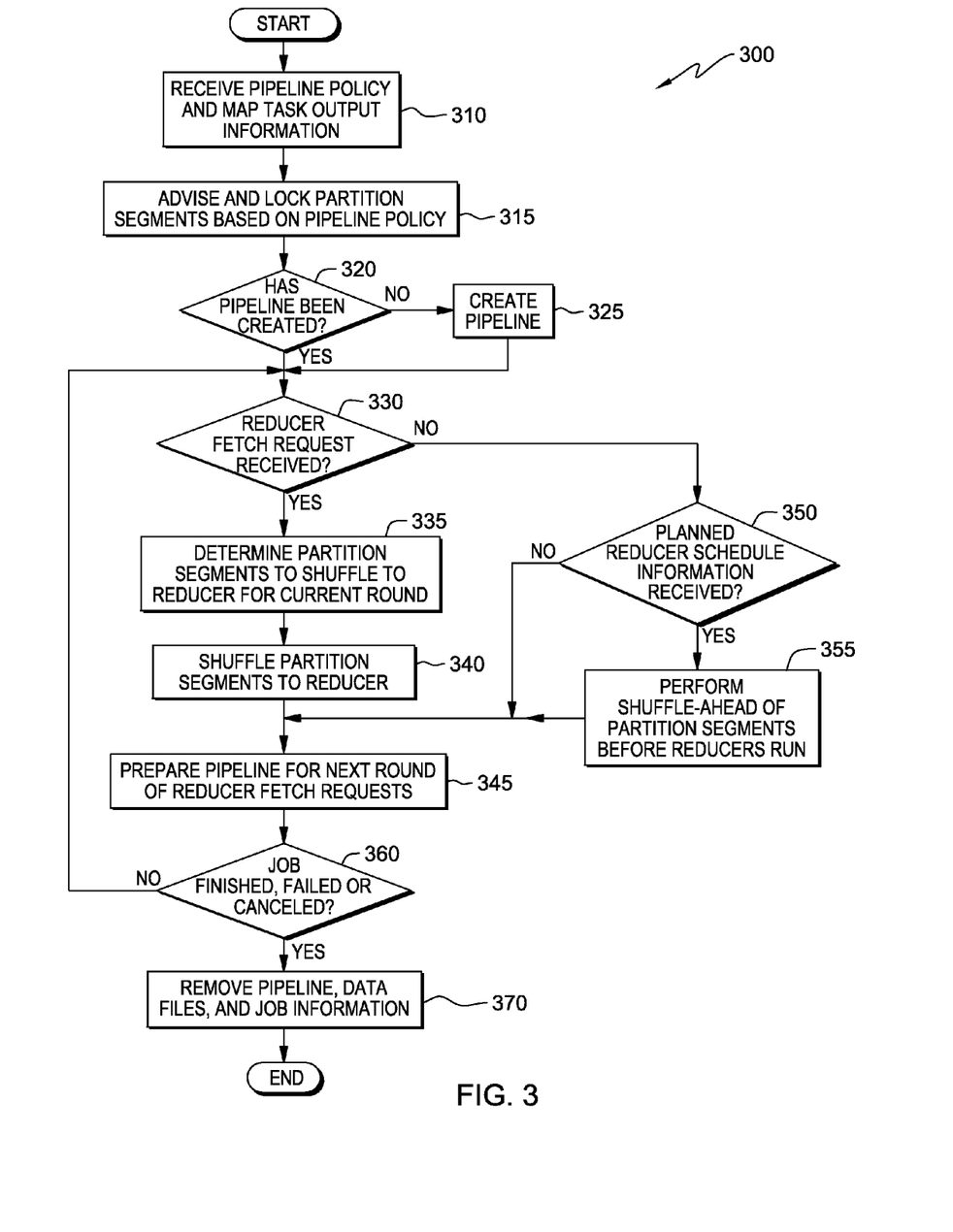
FIG. 3 illustrates operational steps of a shuffle optimization program, operating on a computing device within the distributed computing grid environment of FIG. 1, in accordance with an embodiment of the present invention.

FIG. 3 illustrates operational steps of shuffle optimization program 300, operating on a computing device within the distributed computing grid environment of FIG. 1, in accordance with an embodiment of the present invention. Shuffle optimization program 300 receives a pipeline policy and map task output information (step 310). The pipeline policy can be a configuration parameter defined for the job or determined by information provided by the scheduler. At the start of a job, a scheduler schedules map tasks for the job on resource slots within distributed computing grid environment 100. The shuffler of the node on which the map tasks are scheduled has nothing in its memory regarding intermediate data files, also known as partition segments, until the partition segments have been written by a mapper processing a map task. When the mapper of a map task writes the partition segment data to the local file system, shuffle optimization program 300 receives information for the map task output, including the job ID, the map task ID, the number of partitions in the job (NumPartitions), the intermediate data file path, and the offset and length of each partition segment in the intermediate data file. As additional map tasks are run, shuffle optimization program 300 continues to receive information regarding the map tasks and associated partition segments.

Shuffle optimization program 300 also receives a pipeline policy, which guides a shuffler in managing and preparing a pipeline of map task intermediate data to be shuffled to a reducer in response to a fetch request. Shuffle optimization program 300 uses the pipeline policy to establish shuffle pipelines with the operating system (OS) to create efficiencies for shuffling map task intermediate results to reducer tasks. The pipeline policy may involve requesting memory for intermediate results of map tasks, and/or planned reducer scheduling information to shuffle-ahead partition segments to reducers before reduce tasks begin.

Shuffle optimization program 300 advises and locks partition segments into local memory based on the pipeline policy (step 315). Having received map task output and pipeline policy information, shuffle optimization program 300 advises the OS to keep or load partition segments in memory. In one embodiment of the present invention, the maximum memory size that a shuffler advises the OS may be referred to as MaxAdvisedMemoryForShuffle. By advising the OS, shuffle optimization program 300 can keep or load designated partition segments from map task outputs so that they are in physical memory and more efficiently available to shuffle to reduce tasks. The "advised" OS will work to keep or load the intermediate results in physical memory, such as in OS page cache, and maintain the intermediate results in memory depending on memory capacity.

Shuffle optimization program 300 also requests the OS to "lock" partition segments into physical memory. Locked partition segments are guaranteed in memory until the segments are unlocked.

Locking partition segments into memory gives more certainty of segments being efficiently available to shuffle to a reducer for a current round of fetch requests and avoids delays and inefficiencies of having to read data from disk for shuffling partition segments to reducers. Exemplary Linux system calls to request locked memory for partition segments may be mmap(MAP_LOCKED), or mlock( ). Once the segments are shuffled to reducers, munlock( ), or munmap( ) can be called to unlock the memory.

Having set locked and advised memory limits for partition segments of map task outputs, shuffle optimization program 300 determines if an IO pipeline has been created (decision step 320) for the current job. If map task output has been generated and the shuffler determines that a pipeline for the job has not been created (step 320, "NO" branch), shuffle optimization program 300 creates a pipeline for the current job (step 325). The IO pipeline for the current job makes use of the locked and advised memory limits for holding partition segments in memory such that the order of partition segments sent in response to a reducer fetch request is decided by the shuffler. Shuffle optimization program 300 builds the pipeline by following the pipeline policy for the current job.

Having created the IO pipeline for the current job, or having determined that the IO pipeline has previously been created (step 320, "YES" branch), such as in a second round of reducer fetch requests, shuffle optimization program 300 determines if a reducer fetch request has been received (decision step 330). If no reducer fetch request has been received, (step 330, "NO" branch), shuffle optimization program 300 determines (following path A) if planned reducer schedule information is received (decision step 350), discussed in detail below. Shuffle optimization program 300 continues to receive information regarding the map task output of partition segments.

If shuffle optimization program 300 determines that a reducer fetch request has been received (step 330, "YES" branch), shuffle optimization program 300 determines the partition segments to shuffle to the reducer for the current round (step 335). The reducer fetch request received by shuffle optimization program 300 includes the job ID of the intermediate data, and the reducer task ID which corresponds to the partition ID of the reduce task. The fetch request also includes the current reducer process ID and the previous shuffler process ID on the shuffler host from which the reducer has previously fetched data. The fetch request also includes the number of map tasks of which the partition segments have been fetched for the current reduce task. If the current reducer process ID, shuffler process ID, and number of map tasks can match the recorded information in the current shuffler, the shuffler knows it is synchronized with this reducer in terms of which partition segments have been fetched by this reducer for the current reduce task and which have not. Otherwise, the shuffler and reducer will synchronize on the fetched and un-fetched segments for the reduce task based on recorded information in the reducer and shuffler. This is to insure every segment for a reduce task from each map task is shuffled to the appropriate reduce task and only needs to be shuffled once.

In an embodiment of the present invention, shuffle optimization program 300 responds to the reducer fetch request of the current round by first preferentially sending "locked segments", which are partition segments in locked memory. If there is capacity for additional partition segments to be sent, shuffle optimization program 300 sends "advised segments". Partition segments that are not locked segments or advised segments may be flushed out of memory and written to disk. These partition segments are referred to as un-advised segments. If the current round shuffle of partition segments still has capacity after including locked segments and advised segments, then shuffle optimization program 300 includes un-advised segments in the response for the reducer fetch request for the round.

Shuffle optimization program 300 does not passively respond to the reducer fetch request, but rather responds by including in preferential order, locked segments, followed by advised segments, then if capacity remains in the current round response, un-advised segments, of the partition requested by the reducer. Shuffle optimization program 300 may determine to stop sending partition segments, or send fewer advised segments or un-advised segments, resulting in fewer partition segments being sent than requested by the reducer for the current fetch round. Responding in this manner decreases the possibility of fetching partition segments from disk, and offers more fetch cycles to other reducers that have partition segments in memory.

Having determined the priority and quantity of partition segments to shuffle based on the reducer fetch request of the current round and the pipeline policy, shuffle optimization program 300 sends or "shuffles" partition segments to the reducer (step 340). The partition segments prepared in the pipeline for the current round of fetch requests are aligned with the priority and preference of shuffling locked segments first, followed by advised segments, if capacity is still available for the current round, followed by un-advised segments of the partition. As mentioned previously, shuffle optimization program 300 may limit the partition segments shuffled in response to the reducer fetch request of the current round, avoiding time consuming fetches from disk.

Having responded to the current round of reducer fetch requests, shuffle optimization program 300 prepares the pipeline for the next round of reducer fetch requests (step 345). Shuffle optimization program 300 proactively advises the OS to keep partition segment data in memory, and to load partition segment data from disk into memory, in preparation for the next round of fetch requests by the reducer. The IO pipeline is built by including locked segments and advised segments to be sent to the reducer in response to the next round fetch request. Shuffler optimization program 300 works with the OS to build the IO pipeline after completing the response to the previous reducer fetch request, and prior to the next reducer fetch request, thus avoiding wait delays during the reducer fetch request in the next round.

For example, shuffle optimization program 300 completes shuffling of partition segments to reducer 132 (FIG. 1), having shuffled locked segments and some advised segments of the partition for the reducer. Shuffle optimization program 300 unlocks and un-advises the partition segments that have been shuffled to the reducer, from locked and advised memory, and locks and advises the OS to keep partition segments in advised memory which have not been shuffled, and has the OS load partition segments from disk into advise and/or locked memory, preparing the IO pipeline for the next round of reducer fetch requests. In one embodiment of the present invention, shuffle optimization program 300 may have a mapper write the output of map tasks directly to locked memory.

In preparing the IO pipeline for the next round of reducer fetch requests, shuffle optimization program 300 determines if the job has finished running, has failed, or has been cancelled (decision step 360). Determining that the job has not finished (step 360, "NO" branch), shuffle optimization program 300 returns to determine if a reducer fetch request/subsequent reducer request has been received (loop back to decision step 330) and continues as described above. If shuffle optimization program 300 determines that the job has finished running, has failed, or has been cancelled (step 360, "YES" branch), shuffle optimization program 300 removes the IO pipeline, data file, and job information (step 370) from the memory and disk of the computing device, and ends for this job.

If a reducer fetch request has not been received (decision step 330, "NO" branch), for the case in which a slow-start is configured so that reducers are not started as initial map task output is available but are delayed, shuffle optimization program 300 determines if planned reducer schedule information (path A) is received from the scheduler (decision step 350). As the map tasks of a job complete, the job uses a threshold referred to as a "slow-start" to indicate the point at which adequate map task output is available and for reduce tasks to begin. This is typically expressed as a percentage of map task completion, ranging from 0%, in which map tasks and reduce tasks are started simultaneously, to 100%, in which reduce tasks begin after all map tasks have completed.

A scheduler, such as scheduler 125 (FIG. 1), schedules resource slots on which map tasks and reduce tasks of a job run. Reduce tasks may not need to start running early for shuffling if the corresponding map tasks are still running. Scheduler 125 can plan to dispatch reduce tasks to resource slots on computing devices within distributed computing grid environment 100 without having to start running the reducers on the computing device resources. The scheduling plan for reducers is done by the scheduler, based on intermediate data locality and map-reduce affinity in a job, so that reduce tasks can be scheduled to the same node, nodes near to, or nodes in the vicinity of the corresponding map tasks. The information associated with which computing device a reduce task is planned to run is received by shuffle optimization program 300 so that the computing device associated with the planned running of a reduce task is known. In this manner, shuffle optimization program 300 enables the shufflers and mappers on computing devices of distributed computing grid environment 100 to know on which computing device a reducer is scheduled to run.

Shuffle optimization program 300 performs a shuffle-ahead of partition segments before the reducers run (step 355). Shuffle optimization program 300, running on the shufflers of computing devices within distributed computing grid environment 100, uses the planned reduce task schedule information from the scheduler to fetch partition segments on behalf of the reducers before the reducers are actually started.

In an exemplary embodiment of the present invention, shuffler 140 of computing device 116 (FIG. 1), on which a reducer, such as reducer and reduce tasks 130, is scheduled but has not yet started to run, determines that map tasks have generated their outputs on computing device 110. Shuffler 140 connects with shuffler 131 of computing device 110 to fetch the partition segments corresponding to reducer and reduce task 130 to be run on computing device 116. As the partition segments are fetched from shuffler 131 of computing device 110, by shuffler 140 of computing device 116, the segments can be held in the memory of shuffler 140 of computing device 116, if there is enough memory, and merged into files on the local disk by shuffler 140 in a similar way to the reducer merging in-memory segments into files, if there is not enough memory.

When reducer and reduce tasks 130 on computing device 116 is started, the reducer asks shuffler 140 of computing device 116 to fetch local in-memory partition segments, using a shared memory mechanism such as "mmap( )", as well as local merged files from disk. Since the shufflers, and not the reducers, perform the fetch activity for partition segments, resource slots unused by reducers can be used to run map tasks in the job, or other tasks, improving overall resource utilization and increasing performance by accessing local data.

In another embodiment of the present invention, the mappers of a job receive the planned reduce task schedule information from the scheduler. The mappers, such as mapper and map tasks 133 running on another computing device, such as computing device 110, can connect to shuffler 140 of computing device 116 on which the reducer is planned to run. When connected, mapper and map tasks 133 of computing device 110 can, for example, using remote direct memory access (RDMA), write the map task partition segment data directly to the memory of shuffler 140 of computing device 116, without involving a fetch request from the reducer of reducer and reduce tasks 130 on computing device 116. When the reducers on computing device 116 are started, they can request shuffler 140 of computing device 116 to get the in-memory segments, using a shared memory mechanism such as "mmap( )", as well as request getting local merged files. Because reducer fetch requests are not required, memory to copy map task outputs from the mappers to local memory and disk is saved, and the resource slots that would have been used by reducers and reduce tasks are available to run map tasks or other tasks, thus improving utilization of resources and performance due to the access of local intermediate data.

Alternatively, in another embodiment of the present invention which may be referred to as a push-mode shuffle-ahead, the shuffler, running on another computing device, such as shuffler 131 running on computing device 110, may initiate this push-mode shuffle-ahead so that the mappers, such as mapper and map task 133, can quickly write finished map task outputs to the local file system on computing device 110 and then continue to run other map tasks. Once the finished map task output information is received, shuffler 131 on computing device 110 may connect to the shufflers of the computing devices on which the reduce tasks are planned to run, such as shuffler 140 on computing device 116, on which reducer and reduce tasks 130 is scheduled to run. Shuffler 131 connects and shuffles the partition segments to shuffler 140 on computing device 116. Using the push-mode shuffle-ahead embodiment by jobs having many reduce tasks to run in a large grid can result in higher performance embodiments in which network transactions may be a bottleneck. Higher performance is achieved because mappers don't spend time shuffling partition segments to multiple remote shufflers, although the mappers may need to write the map task outputs to the local file system, which involves additional memory copying than previous embodiment of mappers writing directly to remote shufflers.

Having performed shuffle-ahead of partition segments, shuffle optimization program 300 determines if the job has finished running, has failed, or has been cancelled (decision step 360). Determining that the job has not finished (step 360, "NO" branch), shuffle optimization program 300 returns to determine if a reducer fetch request/subsequent reducer request has been received (loop back to decision step 330), and continues as described above. If shuffle optimization program 300 determines that the job has finished running, has failed, or has been cancelled (step 360, "YES" branch), shuffle optimization program 300 removes the IO pipeline, data file, and job information (step 370), from the memory and disk of the computing device, and ends for this job.

Figure 4:
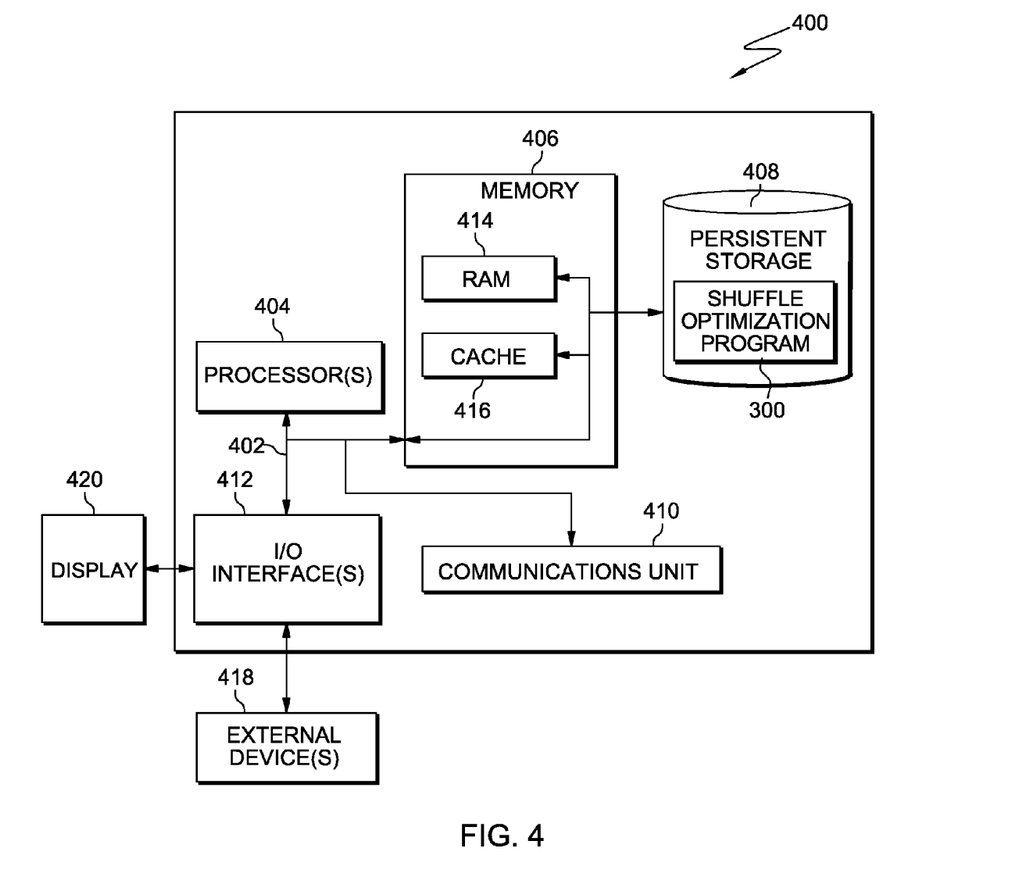
FIG. 4 depicts a block diagram of components of a computing device, capable of operating a shuffle optimization program, in accordance with an embodiment of the present invention.

FIG. 4 depicts a block diagram of components of computing device 400, capable of operating shuffle optimization program 300, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Shuffle optimization program 300 is stored in persistent storage 408 for execution by one or more of the respective computer processor(s) 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed computing grid environment 100, managing server 120, and computing devices 110, 112, 114, and 116. In these examples, communications unit 410 includes one or more network interface cards. Communications unit 410 may provide communications through the use of either or both physical and wireless communications links. Shuffle optimization program 300 may be downloaded to persistent storage 408 through communications unit 410.

I/O interface(s) 412 allows for input and output of data with other devices that may be connected to server computer 102. For example, I/O interface(s) 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention, e.g., shuffle optimization program 300, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for optimizing a MapReduce shuffle, the computer program product comprising:
a computer-readable storage medium having computer-readable program code embodied therewith, the computer-readable program code executable by a processor, to:
receive information associated with partition segments of map task outputs and a pipeline policy for a job running on a computing device;
transmit to an operating system of the computing device a request to lock partition segments of the map task outputs in a memory of the computing device;
transmit to the operating system of the computing device an advisement to keep or load partition segments of map task outputs in the memory of the computing device, based on a capacity of the memory of the computing device, wherein partition segments of the map task outputs requested to be locked in the memory of the computing device are different from the partition segments of map task outputs advised to keep or load in the memory of the computing device;
create a pipeline based on the pipeline policy, wherein the pipeline includes partition segments of map task outputs locked in the memory of the computing device and partition segments of map task outputs advised to keep or load in the memory of the computing device for the job; and
select the partition segments locked in the memory, followed by the partition segments advised to keep or load in the memory, as a preferential order of partition segments to shuffle.

2. The computer program product of claim 1, further comprising program code executable by a processor to shuffle the partition segments, wherein the shuffling further comprises:
receiving a request from a reducer to fetch partition segments of the map task outputs for a current round of fetch requests;
shuffling the partition segments which are selected to the reducer in response to receiving the request for the current round of the fetch requests; and
building the pipeline for a next round of the fetch requests, prior to receiving from the reducer a request for the next round of the fetch requests, wherein the pipeline for the next round of the fetch requests includes partition segments selected in the preferential order.

3. The computer program product of claim 2, wherein the computer-readable program code is further executable by a processor to:
receive, by a shuffler of a first computing device, information associated with which of the partition segments have been shuffled to a current reduce task from a reducer of the job, which is operating on a second computing device; and
synchronize, by the shuffler of the first computing device, the partition segments, which are shuffled and awaiting to be shuffled for the current reduce task, with the reducer of the second computing device, wherein each of the partition segments is to be shuffled to the current reduce task on the second computing device to which the partition segments correspond, and each of the partition segments is shuffled once.

4. The computer program product of claim 1, wherein the computer-readable program code is further executable by a processor to:
receive information including a schedule of a first computing device on which a reduce task is planned to run and has not started to run;
perform a shuffle-ahead prior to the reduce task starting to run, wherein the shuffle-ahead includes a shuffler of the first computing device contacting a shuffler of a second computing device on which partition segments are stored in a pipeline in the shuffler of the second computing device for the job; and fetch, by the shuffler of the first computing device, the partition segments in the pipeline of the shuffler of the second computing device, which are associated with the reduce task scheduled to run on the first computing device, to the shuffler of the first computing device.

5. The computer program product of claim 1, wherein the computer-readable program code is further executable by a processor to:

receive by a shuffler of a second computing device, a plan to schedule a reduce task to run on a first computing device, prior to the reduce task starting to run; and perform, by the shuffler of the second computing device, a shuffle-ahead prior to the reduce task starting to run, wherein the shuffler of the second computing device writes partition segments directly to the memory of the shuffler of the first computing device, prior to receiving a fetch request from the first computing device.

6. The computer program product of claim 5, wherein the shuffle-ahead is performed by a mapper of the second computing device writing the partition segments directly to the shuffler of the first computing device, prior to receiving a fetch request from the first computing device.

7. The computer program product of claim 1, wherein the pipeline policy includes an affinity of map task and reduce task schedule planning, wherein reduce tasks of the job are scheduled to run on resources on or in a vicinity of the resources on which map tasks corresponding to the reduce tasks of the job have been scheduled.

8. The computer program product of claim 1, wherein the pipeline policy includes a shuffler requesting the operating system to lock the partition segments most recently generated into the memory.

9. The computer program product of claim 1, wherein the pipeline policy includes a shuffler advising the operating system to keep or load partition segments most recently generated into the memory, based on the capacity of the memory.

10. A computer system for optimizing a MapReduce shuffle, the computer system comprising:

a memory having computer-readable computer instructions; and a processor for executing the computer-readable computer instructions, the computer-readable instructions executable by the processor to:

receive information associated with partition segments of map task outputs and a pipeline policy for a job running on a computing device;

transmit to an operating system of the computing device a request to lock partition segments of the map task outputs in a memory of the computing device;

transmit to the operating system of the computing device an advisement to keep or load partition segments of map task outputs in the memory of the computing device, based on a capacity of the memory of the computing device, wherein partition segments of the map task outputs requested to be locked in the memory of the computing device are different from the partition segments of map task outputs advised to keep or load in the memory of the computing device;

create a pipeline based on the pipeline policy, wherein the pipeline includes partition segments of map task outputs locked in the memory of the computing device and partition segments of map task outputs advised to keep or load in the memory, of the computing device for the job; and select the partition segments locked in the memory, followed by partition segments advised to keep or load in the memory, as a preferential order of partition segments to shuffle.

* * * * *